(12) United States Patent
Mair et al.

(10) Patent No.: US 10,884,715 B2
(45) Date of Patent: Jan. 5, 2021

(54) METHOD FOR GENERATING SOURCE CODE

(71) Applicant: DSPACE DIGITAL SIGNAL PROCESSING AND CONTROL ENGINEERING GMBH, Paderborn (DE)

(72) Inventors: Michael Mair, Paderborn (DE); Wolfgang Trautmann, Paderborn (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 0 days.

(21) Appl. No.: 16/609,226

(22) PCT Filed: Jul. 12, 2018

(86) PCT No.: PCT/EP2018/068986
§ 371 (c)(1),
(2) Date: Oct. 29, 2019

(87) PCT Pub. No.: WO2019/025155
PCT Pub. Date: Feb. 7, 2019

(65) Prior Publication Data
US 2020/0050434 A1    Feb. 13, 2020

(30) Foreign Application Priority Data
Jul. 31, 2017 (EP) ..................................... 17183987

(51) Int. Cl.
*G06F 8/35* (2018.01)
*G06F 8/41* (2018.01)
*G06F 8/60* (2018.01)

(52) U.S. Cl.
CPC ................. *G06F 8/35* (2013.01); *G06F 8/44* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 8,196,056 B2 * | 6/2012 | Ciolfi | G06F 8/34 715/771 |
| 8,667,474 B2 * | 3/2014 | Radigan | G06F 8/456 717/136 |

(Continued)

OTHER PUBLICATIONS

Roque, Ricarose Vallarta, "OpenBlocks: An Extendable Framework for Graphical Block Programming Systems," MIT, 2007, 61pg. (Year: 2007).*

(Continued)

*Primary Examiner* — Ryan D. Coyer
(74) *Attorney, Agent, or Firm* — Leydig, Voit & Mayer, Ltd.

(57) ABSTRACT

A method for generating source code from one or more blocks of a block diagram includes: generating the block diagram; determining whether the descriptors of first and second block variables are concordant or different and whether or not first and second blocks are located in the same region; and implementing the first and second block variables as a single variable or as two separate variables in the source code based on the determination of whether the descriptors of the first and second block variables are concordant or different and whether or not the first and second blocks are located in the same region. The first and second block variables are implemented in the source code as a single variable if the descriptors of the first and second block variables are concordant and the first and second blocks are located in the same region.

15 Claims, 5 Drawing Sheets

(56) References Cited

U.S. PATENT DOCUMENTS

| | | | | |
|---|---|---|---|---|
| 8,726,120 B2* | 5/2014 | Baptist | ................ | G06F 11/1076 714/752 |
| 9,038,016 B2* | 5/2015 | Kinnucan, Jr. | ....... | G06F 9/4492 717/105 |
| 2005/0138601 A1* | 6/2005 | Simonoff | .................. | G06F 8/34 717/105 |
| 2006/0136181 A1 | 6/2006 | Masse | | |
| 2007/0283322 A1* | 12/2007 | Hsu | ........................... | G06F 8/34 717/113 |
| 2010/0058296 A1* | 3/2010 | Nattinger | .............. | G06F 11/323 717/125 |
| 2010/0306752 A1* | 12/2010 | Bordelon | .............. | G06F 8/4452 717/149 |
| 2014/0109036 A1* | 4/2014 | Desmukh | ............ | G06F 11/3457 717/104 |

OTHER PUBLICATIONS

Rugina et al., "Symbolic Bounds Analysis of Pointers, Array Indices, and Accessed Memory Regions," ACM, 2000, 14pg. (Year: 2000).*

Smith, et al., "Compiling for EDGE Architectures," IEEE, 2006, 11pg. (Year: 2006).*

Aho A V et al: "Compiler—Principles, Techniques and Tools", Jan. 1, 1986 (Jan. 1, 1986), XP002200775, pp. 411-415.

* cited by examiner

US 10,884,715 B2

METHOD FOR GENERATING SOURCE CODE

CROSS-REFERENCE TO PRIOR APPLICATIONS

This application is a U.S. National Phase application under 35 U.S.C. § 371 of International Application No. PCT/EP2018/068986, filed on Jul. 12, 2018, and claims benefit to European Patent Application No. EP 17183987.1, filed on Jul. 31, 2017. The International Application was published in German on Feb. 7, 2019 as WO 2019/025155 A1 under PCT Article 21(2).

FIELD

The invention relates to the generation of executable code from a block diagram, in particular for programming control devices.

BACKGROUND

Control devices are used in a variety of applications to record physical quantities of a process and/or to act on a process via connected actuators; for example, they may comprise an anti-blocking control of a braking process. The time constants that determine the dynamic behavior of the process often cause cycle times of 1 ms or shorter, such that a real-time capability of the control device is required. For cost reasons, control devices often have microcontrollers with low memory and limited computing power, for which reason the size and efficiency of the executable code is critical.

In order to accelerate the design of control devices, control strategies on the basis of models in a computing environment such as MATLAB/Simulink are often developed. In this manner, the process and/or controller or the general behavior of the control device may be first simulated, and the presence of desired properties may be checked. In particular, the models may comprise block diagrams that contain blocks that perform operations such as calculations, wherein a block is able to calculate an output signal from multiple input signals, for example. As a rule, block diagrams are executed cyclically, wherein all blocks are kept permanently in memory, and each block is executed once per time step. In particular, a block may apply one or more operations to input signals from the last step, in order to generate output signals from the current step. Source code for programming the control device may be generated directly from the models via a code generator. For example, a code generator for the generation of production quality source code is described in "Production Quality Code Generation from Simulink Block Diagrams", Proceedings of the 1999 International Symposium on Computer Aided Control System Design, Kohala Coast, Hawai'i, by H. Hanselmann et al.

If models are described in the form of a block diagram, wherein blocks for exchanging data or forwarding signals are linked via directional connections or signal connections, a common approach for code generation is to generate a variable in the source code for each output of a block. As a rule, more block variables are created than are actually necessary, such that there is room for optimization. A possible optimization is to map the block variables of different blocks to a common variable in the source code. However, this grouping of block variables, also known as "merging," is not innocuous, because the further use of a variable in multiple blocks can lead to undesired side effects, in particular by changing the data flow in the source code.

SUMMARY

In an exemplary embodiment, the present invention provides a method for generating source code from one or more blocks of a block diagram. The method comprises: generating, by a computer system, the block diagram, wherein the block diagram comprises a model of a dynamic system having at least one signal connection between two blocks, wherein the block diagram is executable to simulate the dynamic system, wherein at least one region in which one or more blocks is located is defined in the block diagram, wherein the block diagram comprises a first block and a second block, wherein the first block has a first block variable and the second block has a second block variable, and wherein each block variable of the block diagram has a descriptor; determining, by the computer system, whether the descriptors of the first and second block variables are concordant or different and whether or not the first and second blocks are located in the same region, wherein determining whether the descriptors of the first and second block variables are concordant or different is based on comparing the descriptor of the first block variable with the descriptor of the second block variable; and implementing, by the computer system, the first and second block variables as a single variable or as two separate variables in the source code based on the determination of whether the descriptors of the first and second block variables are concordant or different and whether or not the first and second blocks are located in the same region. The first and second block variables are implemented in the source code as a single variable if the descriptors of the first and second block variables are concordant and the first and second blocks are located in the same region. The first and second block variables are implemented in the source code as two separate variables if the descriptors of the first and second block variables are different and/or the first and second blocks are not located in the same region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
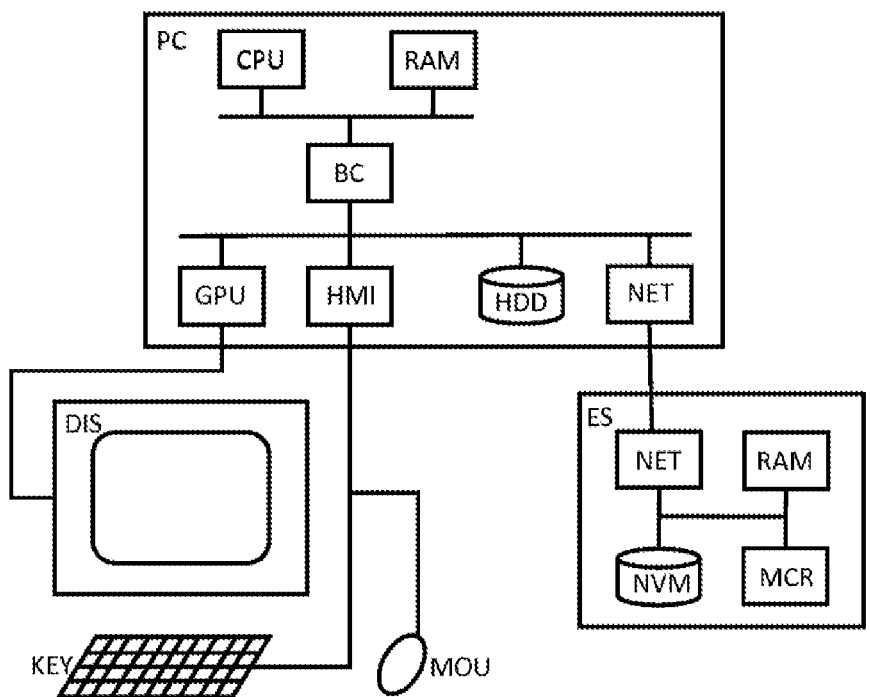
FIG. 1 depicts an exemplary embodiment of a computer system.

Exemplary embodiments of the present invention provide for generation of relatively more compact source code while avoiding undesired side effects.

In an exemplary embodiment, a method for generating source code from one or more blocks of a block diagram is provided, wherein the block diagram comprises a model of a dynamic system with at least one signal connection between two blocks and may be executed to simulate the dynamic system. At least one region in which one or more blocks are located is defined in the block diagram, wherein the block diagram comprises a first block and a second block, wherein the first block has a first block variable and the second block has a second block variable, wherein each block variable of the block diagram has a descriptor, wherein the descriptor of the first block variable is compared with the descriptor of the second block variable, wherein there is an examination as to whether or not the first block and the second block are located in the same region, and wherein the first block variable and the second block variable are implemented in the source code as a single variable if the descriptors are concordant and the blocks are located in one region, and wherein the first block variable and the second block variable are implemented in the source code as two separate variables if the descriptors are different and/or the blocks are not located in the same region.

Data or signals may be transmitted via a signal connection; in so doing, a first block outputs one value or, depending on the definition, multiple related values, and a second block receives them and takes them into account when determining one or more related output values of the second block. Signals can contain scalar variables and/or structured data types such as arrays, as is the case with a bus, for example.

Block variables may be explicitly defined in the block or may be generated automatically, for example on the basis of a signal connection. The descriptors or names of block variables may be fixed, or may be defined on the basis of generation provisions or generation rules, with or without predefined avoidance behavior. In particular, with block variables for an output signal of a block, the descriptor can include the name of the port in the block from which the signal originates. Thus, descriptors can always remain fixed, or in event of a conflict of multiple concordant descriptors, at least one descriptor is modified according to a given rule. It may be advantageous to provide that two variables, which have fixed concordant descriptors, are grouped if one or more eligibility conditions are met.

The definition of regions may be used to control whether and in which environment block variables may be grouped. Thus, a grouping of variables in semantically uncorrelated areas of the block diagram can be ruled out. This avoids hard-to-find side effects caused by erratic changes in the data flow.

Block diagrams may be defined hierarchically, wherein a block at a higher level can comprise multiple blocks at a subordinate level, wherein blocks at a subordinate level are assigned to a block at a higher level. It may be advantageous for each block of a subordinate level to belong to a block of a higher level. Blocks may be defined via assigned blocks in subordinate levels or may be simple blocks without a substructure. A hierarchical structure of the block diagram improves the overview.

The block diagram may comprise one or more definition blocks, wherein a region is defined by a definition block in such a manner that the block of the next higher level comprising the definition block and all blocks assigned to this block are located in the region. The comprising block of the next higher level may be formed in particular as a subsystem. Blocks that are not located in one region spanned by a definition block may be assigned to an additional region, such that each block of the block diagram is located in one region. Alternatively, it may also be provided that only those blocks that are located in one region defined by a definition block may be grouped.

Definition blocks may be dedicated for the definition of one region only. However, it is also possible to assign the property of a definition block to certain semantic blocks at the same time. In particular, such blocks may comprise function blocks that indicate that the surrounding subsystem is to be implemented as a function in the source code, and may define further properties of the function. Since one function forms one unit in the source text, it is useful, for example, to restrict the grouping of variables to such unit for the sake of clarity. If the block diagram is used to model an AUTOSAR software component, the property of a definition block may also be assigned to a runnable block in particular to define a runnable as an independent sub-unit of the software component.

The block diagram may comprise at least two definition blocks, which are encompassed by a common block of a higher level, wherein a first definition block is arranged in a first level and a second definition block is arranged in a second level subordinate to the first level, wherein the first block defines a first region and wherein the second block defines a second region in such a manner that the block comprising the second definition block of the next level higher than the second level and all blocks assigned to such block are located in the second region. In principle, the second level may be arranged several hierarchy levels below the first level. This enables a more targeted control, in which regions variables may be grouped.

In particular, there can be at least two varieties of definition blocks, wherein a variety of marked definition blocks is defined, wherein, in the event that the first definition block is a marked definition block, the first region and the second region are grouped into a common region, and wherein, otherwise, the first region and the second region are treated as separate regions. For example, a function block or a runnable block may be defined as a marked definition block. By preventing fragmentation of the clearly defined uniform region of a function or a runnable, the ability to optimize the block diagram is maintained.

It is advantageous if the descriptor of a block variable is determined from an evaluation of at least one generation rule, wherein the generation rule determines the descriptor of the block variable on the basis of the block of a higher level in which the block having the block variable is contained and/or on the basis of the region in which the block having the block variable is located. In doing so, it is advantageous if there is an examination as to whether or not two blocks are located in the same region by comparing the descriptors of the block variables. The descriptor may be specified at least partially in the form of a name macro such as $(Scope)_$B. The generation rule or name macro is evaluated at the point in time the code is generated, wherein $(Scope) is replaced by the name of the region, in particular a comprehensive subsystem, and $B is replaced by the name of the block. In principle, additional name macros or placeholders may be defined and included in the name of one or more descriptors. It may also be provided that an alternative rule is assigned to each name macro, in order to enable an automatic resolution in the event of name conflicts. Alternatively, alternative rules may be assigned to one block or one region. The descriptor may also usefully have a fixed name component.

If two block variables have the same name based on the name macros, or if a name conflict occurs, different alternative rules may be applied. For example, it may be provided that that a count component is added to the name obtained by evaluating the name macro (such as "VarName_a", "VarName_b", . . . , "Varname_aa", "Varname_ab", . . . ). This ensures that the same name does not arise randomly. Alternatively or in addition, it may also be provided that the name of a region, which may initially only contain local information on the basis of the name macro, is extended with context information, for example by prefixing a file name or the name of one or more hierarchically superordinate blocks, such as comprehensive subsystems, to the name of the region. It may also be alternatively or additionally provided that the user specifies a possible name component that, in the event of a name conflict, is used in addition to or instead of a name component defined in the name macro. An alternative rule may check additional boundary conditions and, in particular, may include a shortening rule if a given maximum length is exceeded. For example, it may be provided that, with hierarchically composite names, i.e. containing multiple regions in succession, the associated name component of one or more of such regions is shortened in such a manner that only individual initial letters of the descriptor of the corresponding region are retained in the name. This is particularly advantageous if language standards specify a maximum length of variable names, or if such names are only evaluated up to a certain point.

It is advantageous if predefined blocks that provide a functionality may be inserted from a library into the block diagram, wherein multiple blocks with the same functionality can be present in the block diagram. In the event that there are multiple instances of a block in the block diagram, it may be advantageous either to define an independent region for each instance, or to define a common function for the instances and a data structure with the block variables for each instance, wherein the corresponding data structure is transferred to the function depending on the block to be executed. A block or a subsystem, which is used multiple times in the block diagram, can come from a library or from a referenced file. It is advantageous if, upon multiple use, the complete contents of the library block or the referenced model are not copied, but rather a cross-instance function of the block is combined with an instance-specific data structure. This makes it possible to keep the generated source code particularly compact. In particular, it is useful to store the data in a structure that is referenced by a pointer. This enables the statements to be used as often as required, wherein only the data must be present in the memory multiple times. Thus, the usually limited working memory of a control device is also utilized to a lesser extent. In the event of multiple instances, the use of alternative rules, such as a counter, is particularly advantageous in order to ensure clear and sufficiently short names.

Each block variable may have an eligibility marker, which may be set or not set, and two block variables may be implemented in a common variable only if the eligibility marker is set in both block variables. The eligibility marker may be set indirectly for one or more variables, for example by referencing a definition data collection, in particular by assigning a variable class or a variable type that defines one or more common properties for different variables. Setting an eligibility marker allows the user to directly influence the optimization. The eligibility marker may be valid unconditionally or allow optimization only in connection with the fulfillment of an additional condition. In principle, block variables or blocks may also be assigned an unconditional additional marker and one or more check markers.

Each block variable may have at least one check marker which may be set or not set, and two block variables may be implemented in a common variable only if the check marker is set in both block variables and at least one check condition assigned to the check marker is also fulfilled. Thus, it can be automatically ensured that the optimization produces meaningful results in the present model.

It may be advantageous to examine one or more of the following check conditions:
 Whether or not the block variables within the block are not changed but are only read out.
 Whether or not the lifetimes of different instances of the block variables are disjunct, such that the two block variables are read or written only at different, non-overlapping times.
 Whether or not the same variable definition is assigned to the block variables in a definition data collection. A variable definition can include in particular the specification of a basic data type, the minimum and/or maximum value and/or a scaling.
 Whether or not the block variables are arranged at an equally specified directional connection. A directional connection between two blocks may indicate the exchange of signals; signals may have a scalar data type or may be composed of multiple scalar data types, such as a bus. The signal is transmitted from an output block to one or more target blocks. Two block variables fulfill the condition, in particular if one is defined in the source block and the other is defined in a target block.

Thereby, it may be provided that one check condition is assigned to one check marker, or that multiple check conditions are assigned to one check marker, wherein variables are only grouped if all the conditions assigned to the check marker are fulfilled. There can also be more than one check marker, wherein one or more check conditions are assigned to each individual check marker.

One or more parameters may be assigned to one block variable, wherein two block variables are implemented in a common variable only if one or more of the following additional conditions is fulfilled:
 The block variables were assigned the same data type
 The block variables were assigned compatible units of measurement
 The names of block variables are determined via generation rules, wherein only block variables whose names were determined using the same generation rule are grouped together.

At least one block variable may be automatically generated on the basis of directional connections between blocks, wherein, in the event that a first block is connected to a second block and the second block is connected to a third block, one block variable of the first block is generated for the connection originating from the first block, and one block variable of the second block is generated for the connection originating from the second block, wherein the two block variables are then implemented as a common variable in the source code if the first block and the second block are located in the same region.

It is advantageous if a separation region is defined, wherein the block variables of blocks located in the separation region are always implemented as separate variables in the source code. In particular, the outermost region may be predefined as a separation region, wherein definition blocks in subordinate hierarchy levels then define individual regions in which block variables may be grouped.

The invention further relates to a method for configuring a control device, wherein the control device comprises at least one arithmetic unit and may have at least one sensor and/or at least one actuator for acquiring data from and/or acting upon a physical process, the method comprising the steps of
  a. Reading a block diagram,
  b. Generating a source code with a method according to one of the previous claims,
  c. Compiling the source code for the arithmetic unit, such that an executable code is generated,
  d. Transferring the executable code to the control device, and
  e. Storing the executable code in a non-volatile memory of the control device and/or executing of the executable code by the control device's arithmetic unit.

Furthermore, the invention relates to a computer program product with a computer-readable storage medium on which instructions are embedded that, if executed by a processor, cause the processor to be configured to execute a method in accordance with an exemplary embodiment of the invention.

Further, the invention relates to a computer system comprising a human-machine interface, a non-volatile memory and a processor, wherein the processor is configured to execute a method in accordance with an exemplary embodiment of the invention.

The invention is explained in more detail below with reference to the drawings. In doing so, similar parts are labeled with identical designations. The embodiments shown are illustrative; that is, the distances and the lateral and vertical dimensions are not to scale and, unless otherwise indicated, do not have any derivable geometric relations relative to each other.

FIG. 1 shows an exemplary embodiment of a computer system PC. This has a processor CPU, which may be implemented as a multi-core processor in particular, a working memory RAM and a bus controller BC. The computer system PC may be configured to be operated directly manually by a user, wherein a monitor DIS is connected via a graphics card GPU, and a keyboard KEY and a mouse MOU are connected via a peripheral interface HMI. In principle, the human-machine interface of the computer system PC could also be configured as a touch interface. The computer system also includes a non-volatile data memory HDD which may be configured in particular as a hard disk and/or solid state disk, along with an interface NET, in particular a network interface. A control unit ES may be connected via the interface NET. In principle, one or more arbitrary interfaces, in particular wired interfaces, can be present on the computer system PC and can each be used for the connection with a control unit ES. A network interface according to the Ethernet standard may be used; the interface NET may also be configured to be wireless, such as a wireless local area network (WLAN) interface in particular, or according to a standard such as Bluetooth.

The control device ES may be configured as a serial control device or as an evaluation board for a target platform. It may be advantageous to include an interface NET for connecting to the computer system PC, a microcontroller MCR with an architecture deviating from that of the processor of the computer system, a working memory RAM and a non-volatile memory NVM.

Figure 2:
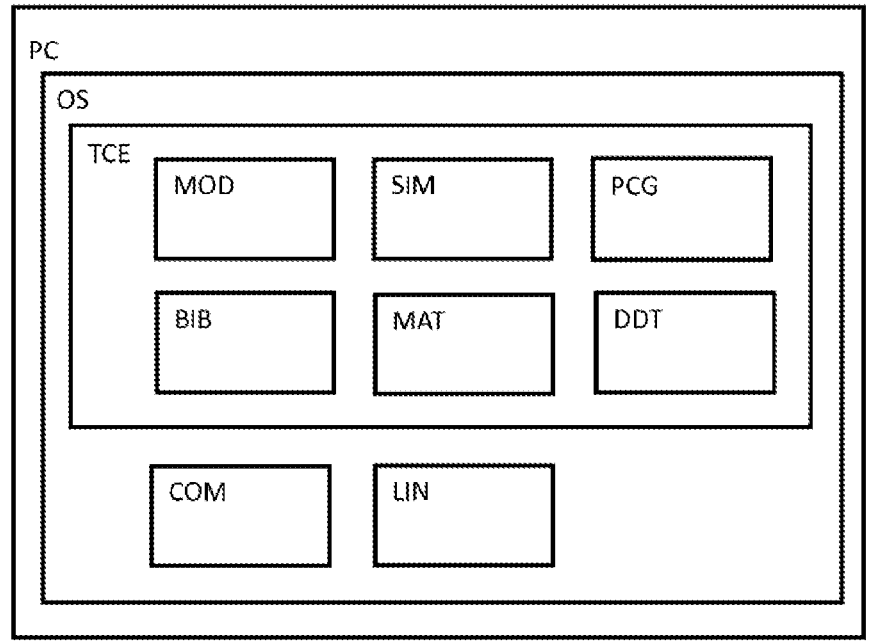
FIG. 2 depicts an exemplary schematic representation of software components available on a computer system.

FIG. 2 shows an exemplary diagram of software components installed on the computer system PC. Such components use mechanisms of the operating system OS, for example to access the non-volatile memory HDD or to establish a connection to an external computer via the network interface NET.

A technical computing environment TCE enables the creation of models and the generation of source code from the models. In a modeling environment MOD, models of a dynamic system may be created via a graphical user interface. In particular, these may be block diagrams that comprise multiple blocks and describe the temporal behavior and/or internal states of a dynamic system. At least some of the blocks are connected by signals; that is, directional connections for the exchange of data, which can be scalar or composite. Blocks can be atomic; that is, they can provide a predefined functionality in one step. If block diagrams are hierarchical, a large number of blocks at a subordinate level can describe the structure of a block at a superordinate level. Atomic blocks may then also include a large number of blocks at a subordinate level. Composite blocks may in particular be subsystems; subsystems may have additional properties, such as the implementation in a separate function and/or a triggering of the execution of the subsystem via a dedicated signal. In subsystems, special blocks may be arranged to further specify the properties of the subsystem. The computing environment TCE comprises one or more libraries BIB, from which blocks or modules may be selected for the construction of a model. In a script environment MAT, instructions may be entered interactively or via a batch file in order to perform calculations or modify the model. The computing environment TCE also includes a simulation environment SIM which is configured to interpret or execute the block diagram in order to investigate the temporal behavior of the system. Such calculations may be performed with high accuracy floating-point numbers on one or more cores of the microprocessor CPU of the computer system.

With the help of a code generator PCG, a source code may be generated from a created model, for example in a programming language such as C. In a definition data collection DDT, additional information regarding the model, in particular on the block variables, may be advantageous. Value ranges and/or scalings may be assigned to the block variables, in order to support a calculation of the model with fixed-point instructions. The desired properties of the source code, for example conformity to a standard such as MISRA, may also be set or stored in the definition data collection DDT. Each block variable may be assigned to a given variable type, and one or more desired properties, such as the eligibility of optimizations such a grouping of variables, is set. The code generator PCG preferentially evaluates the settings of the definition data collection DDT and takes these into account when generating the source code. The definition data collection DDT may have a tree structure or may be stored as a simple file in a memory of the computer system; alternatively, storing the definition data in a dedicated database system may be provided. The definition data collection may have a program interface and/or import/export functions.

The computer system PC has a compiler COM and a linker LIN, which may be configured for generating binary files that may be executed on a control device ES and/or the computer system PC. In principle, a large number of compilers may be available, in particular cross-compilers for different target platforms, in order to support control devices or evaluation boards ES with different processor architectures.

Figure 3:
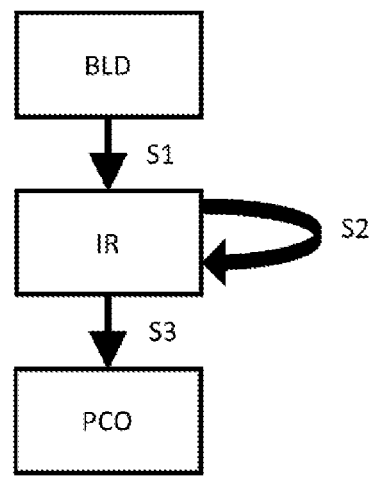
FIG. 3 depicts an exemplary general scheme of generating source code.

FIG. 3 shows a general scheme for generating source code via a code generator. The method may be executed entirely by a processor of an exemplary embodiment of the computer system PC; however, it may also be executed in a client-server environment with an operating computer and one or more servers connected by a network, wherein, in particular, computationally intensive steps are performed on the servers.

In a first step S1, a transformation, the selected model from one or more blocks of the block diagram BLD is transformed into an intermediate representation IR which may comprise one or more hierarchical graphs. In particular, this can be a data flow graph, a control flow graph or a tree structure. In addition to the block diagram BLD, it may be advantageous to also take additional information from a definition data collection DDT into account when generating the intermediate representation, or incorporate said information thereinto. This may also include situations in which elements are generated based on information in the definition data collection DDT or in which properties of elements or settings relevant to code generation, such as the data type of a variable, are extracted from the data definition collection DDT.

In a second step S2, an optimization, the hierarchical graphs are optimized in order to reduce the number of variables required and/or memory consumption, such as stack usage, and/or the number of operations and/or processor instructions and/or the execution time of the source code. Such optimization may comprise a large number of intermediate steps in which further intermediate representations between the model/block diagram and source code/program text are generated. In particular, it may be provided that, in each intermediate step, a set of original hierarchical graphs is converted into a different set of modified hierarchical graphs, wherein one or more optimization rules is applied. Various strategies such as "constant folding" or the elimination of "dead code" may be applied during optimization. It may also be provided that individual optimizations are applied already within the framework of the transformation in step S1, in particular if they can be performed more easily on a block diagram display. Within the framework of the invention, it is possible in principle that multiple variables generated in step S1 are grouped in step S2, and that multiple variables of the block diagram are grouped in step S1 in such a manner that the first intermediate representation already contains only one variable.

In a third step S3, a translation, the optimized intermediate representation IR or the optimized hierarchical graphs, which result from the entire intermediate steps performed, are translated into source code PCO of a textual programming language, such as, in particular, C code. Moreover, an additional optimization may be carried out in this step, in particular in such a manner that the generated instructions represent a subset of the instructions that are, in principle, included by the language, and/or that the generated control structures represent a subset of the control structures that are, in principle, included by the language. This makes it possible to fulfill precisely defined rules. Alternatively or in addition, it may be provided that additional information, such as a reference between the program line and the block of the block diagram BLD is generated, and in particular that it is incorporated into the source code in the form of comments, in order to improve the readability of the source code PCO and/or to simplify debugging.

During or after code generation, information regarding the current block diagram or results of code generation, such as warnings, may be stored in the definition data collection. Such information may be used, for example, to influence a compilation of the generated source code or to provide meta information for other tools, such as calibration information in ASAP2 format or information to generate an intermediate layer according to the AUTOSAR standard. In alternative embodiments of the invention, code in a hardware description language, or a configuration of a programmable hardware block may be generated from the block diagram.

Figure 4:
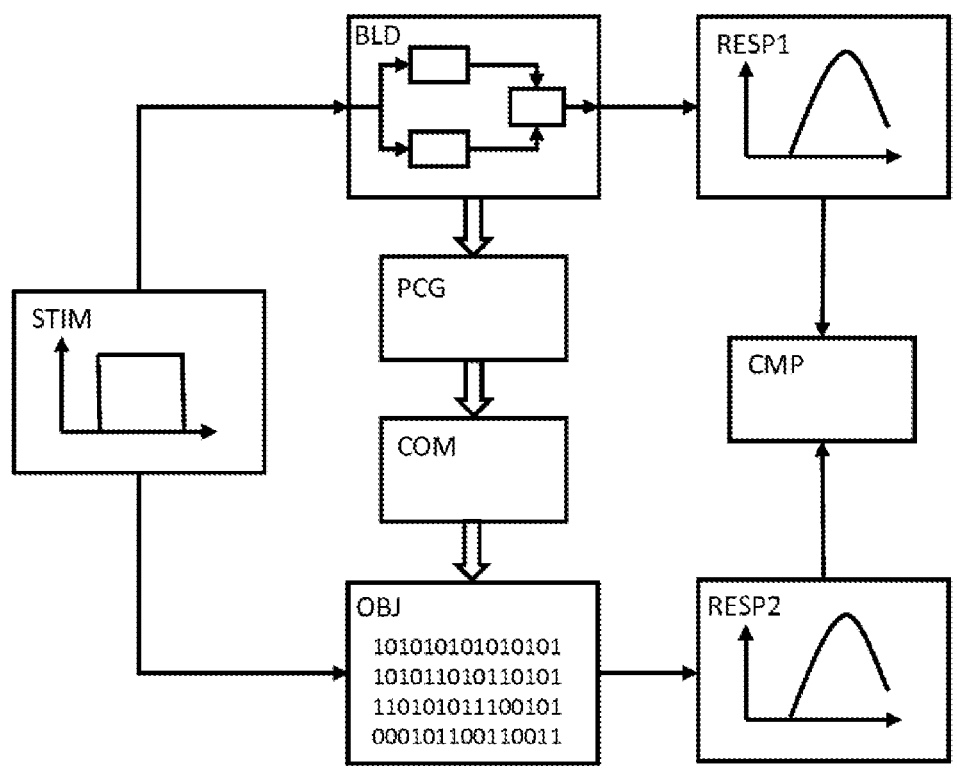
FIG. 4 depicts an exemplary schematic representation of an examination of generated source code on the basis of a block diagram.

FIG. 4 shows a schematic representation of the examination of the generated source code using the block diagram.

In the example shown, a block diagram BLD or a subsystem consisting of three blocks is schematically represented, which has an input port for receiving an input signal and an output port for sending an output signal. The block diagram may describe a predetermined or desired behavior of a control program. If the block diagram is executed in the simulation environment not shown here, the behavior is calculated for successive time steps; in particular, the block diagram BLD may be thereby interpreted directly. From the specification or the provided application, multiple test cases were determined in advance, which in particular include stimuli STIM as input signals for the control program, wherein a corresponding output signal RESP is assigned to the stimuli.

In the example shown, a stimulus STIM is shown as a diagram, which indicates a certain temporal behavior of the input signal. If the control program or block diagram BLD is executed in the simulation environment of the computer system, a current value of the stimulus STIM is applied to the input port of the block diagram BLD for a large number of time steps, and the operations corresponding to the blocks are calculated in order to determine an internal state and/or an output signal of the control program. By recording the output signal during the execution of the block diagram, a target response RESP1 may be determined in a model-in-the-loop simulation. Since all arithmetic operations are calculated with a high degree of accuracy, for example by variables always having the double data type and thus by floating-point calculations being performed, on the one hand, the correct behavior of the model may be verified and, on the other hand, the simulation result is sufficiently accurate to use the stored output signal or the target response RESP1 as reference data.

After the correctness of the model has been confirmed, the code generator PCG generates source code from the blocks of the block diagram corresponding to the control program. The generated source code is then compiled with a compiler COM into object code OBJ, which may contain instructions for the processor of the target system. The object code may be grouped by a linker into an executable file in the operating system of the target system. During code generation, settings may be applied regarding the conversion of model operations into fixed-point representation, which thus include a corresponding scaling, or general transformations to reduce computational effort, in order to enable real-time execution on less powerful hardware such as a microcontroller of an embedded system ES.

In order to ensure that the optimized version of the control program or the generated source code has a behavior corresponding to the block diagram, a software-in-the-loop simulation is used in which the target system corresponds to the computer system PC, or a processor-in-the-loop simulation in which the target system is an embedded system. Thereby, the stimulus STIM is fed to the executable file with the object code OBJ during the specified execution period, and the output signal of the generated source code resulting from the calculations is recorded in order to obtain the actual response RESP2.

The target response RESP1 of the model-in-the-loop simulation may be displayed on the computer system simultaneously with the actual response RESP2 of the generated code, in order to enable a visual comparison for the user. Alternatively or in addition, a comparison of the target response RESP1 and the actual response RESP2 may be calculated in a comparison program CMP. This enables, for example, the determination of an evasion measure and/or the examination of one or more check conditions, for example, the calculation of a point-by-point difference between the actual response and the target response and the comparison with a threshold value or a maximum permissible evasion.

Figure 5:
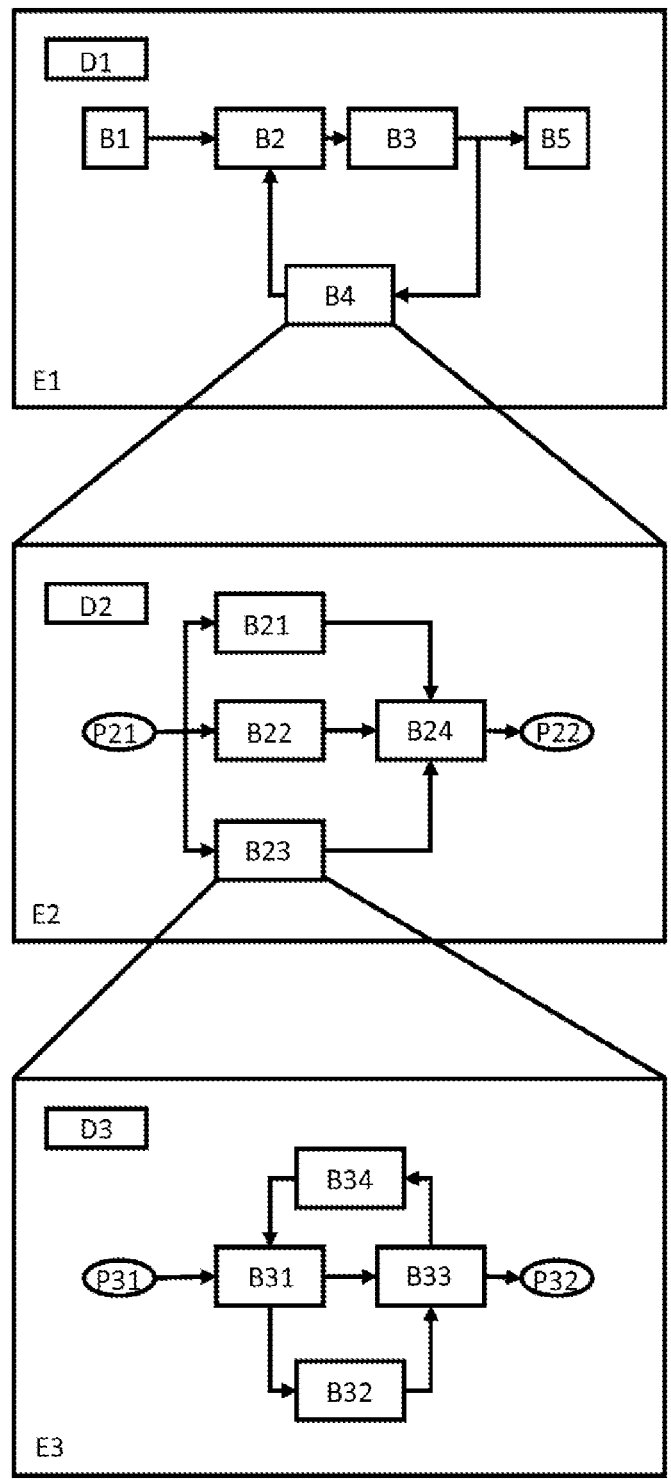
FIG. 5 depicts an exemplary schematic representation of a block diagram in accordance with an example having multiple hierarchy levels.

FIG. 5 shows a schematic representation of a block diagram in accordance with an example having multiple hierarchy levels, wherein blocks of each hierarchy level are shown in a rectangular outline.

In the first (highest) hierarchy level E1, the block diagram shown comprises a large number of blocks $B_i$, $i=1 \ldots 5$, which are connected to each other via signals, wherein the direction of the connection indicates the signal flow. Furthermore, a definition block D1 is shown; this defines a first region, such that the blocks $B_i$, $i=1 \ldots 5$ are located in such first region. The blocks B1, B2, B3 and B5 may be atomic or simple, or may have a substructure that is not shown. Block B4 is a composite block whose functionality is defined by blocks in a second (subordinate) hierarchy level E2.

The section of a second hierarchy level E2 shown comprises a large number of blocks $B_{2j}$, $j=1 \ldots 4$, a definition block D2 and two ports for the exchange of signals with the superordinate or highest hierarchy level, an input port P21 and an output port P22. The blocks B21, B22 and B24 may be atomic or simple, or may have a substructure that is not shown. Block B23 is a composite block whose functionality is defined by blocks in a third (lowest) hierarchy level.

The section of a third hierarchy level E3 shown comprises a large number of blocks $B_{3k}$, $k=1 \ldots 4$, a definition block D3 and two ports for the exchange of signals with the superordinate or second hierarchy level, an input port P31 and an output port P32. The blocks B31, B32, B33 and B34 may be atomic or simple, or may have a substructure that is not shown. In principle, block diagrams can have any number of hierarchy levels; for the sake of clarity, no further hierarchy levels are displayed here.

In principle, different blocks may be used as definition blocks; composite blocks, which may be called by other model parts and comprise a coherent functionality or code unit, may form a separate region. These may be functions, in particular at the top level of the block diagram. If the block diagram is used to model control device code according to the AUTOSAR standard, a runnable may form a separate region. In this case, the block covering the region, or one block arranged in the region, may serve as the definition block. It may be provided that dedicated blocks are used for the definition of a region; thus, for example, a scope block is predefined. According to an alternative embodiment of the invention, blocks that specify the properties of the function or the runnable are simultaneously defined as definition blocks.

It may be provided that a defined region includes all hierarchically subordinate blocks. Thus, if definition block D1 defines a first region, it may be advantageous to have blocks $B_{2j}$, $j=1 \ldots 4$ and $B_{3k}$, $k=1 \ldots 4$ located in this first region in addition to blocks $B_i$, $i=1 \ldots 5$. With respect to port blocks, it may also be provided that such blocks are part of the comprising region.

In addition, it may also be provided that a distinction is made between marked definition blocks, for example the definition block assigned to a runnable, and normal definition blocks. For example, if D2 were a marked definition block, the first region defined by D1 would comprise only the blocks $B_i$, $i=2 \ldots 5$, whereas the second region defined by D2 would comprise both the blocks $B_{2j}$, $j=1 \ldots 4$ and the blocks $B_{3k}$, $k=1 \ldots 4$. It may be provided that there is only one type of marked definition blocks. It may be advantageous for normal definition blocks to define a region only if there is no marked definition block in a superordinate level.

Furthermore, it may be provided that normal definition blocks can "cut out" a new region from a superordinate region defined with a normal definition block. If D1, D2 and D3 are normal definition blocks, the first region defined by D1 can comprise blocks B1, B2, B3, B5, while block B4 forms the second region defined by definition block D2. Such second region then comprises blocks B21, B22 and B24, while block B23 forms the third region defined by definition block D3. The blocks $B_{3k}$, $k=1 \ldots 4$ are then located in the third region.

With reference to the diagram shown in FIG. 5, some exemplary embodiments of generation rules are briefly described below. In this case, D1 is a marked definition block, in particular a runnable, D2 is a regular definition block, in particular defining a sub-function, and D3 is a regular definition block, in particular defining a library block without defining its own function. For the sake of simplicity, in the present case, the region spanned by a definition block is given the same name as the definition block.

If the block variables of B2, B3, B21, B24, B31 and B33 are each assigned the generation rule or the name macro "$(Scope)_X", then, upon a code generation, variables with the descriptor "D1_X" arise for the blocks B2, B3, variables with the descriptor "D2_X" arise for the blocks B21, B24 and variables with the descriptor "D3_X" arise for the blocks B31, B33. Provided that any additional conditions are fulfilled, the variables of block B2 may be grouped with those of block B3, for example.

It may also be provided that a generation rule distinguishes between marked regions or marked definition blocks and regular regions or definition blocks. If the generation rule or the name macro "$(Scope:ParentFunction)_Y" is assigned to the block variables of the blocks B1, B22 and B32, wherein the surrounding function is thus taken into account, then, upon a code generation, variables generated from the block B1 are assigned the descriptor "D1_Y", and variables generated from the blocks B22 and B32 are assigned the descriptor "D2_Y". If the generation rule "$(Scope:Runnable)_Z" is assigned to each of the blocks B5 and B34 or their block variables, wherein the surrounding runnable is thus taken into account, upon a code generation, variables with the descriptor "D1_Z" are generated for both B5 and B34. If possible additional conditions are fulfilled, the variables of B5 and B34, for example, may be grouped.

It is particularly advantageous if, when grouping variables, not only the descriptors themselves are compared, but also the respective generation rules are taken into account. If, in accordance with this optional additional condition, it is then determined that the descriptor of a first variable has been generated on the basis of the generation rule "D1_X" (i.e., a fixed value), and the descriptor of a second variable was generated on the basis of the generation rule "$(Scope:

Runnable)_X", it is useful for the variables not to be grouped, but for a warning or error message to be issued. This reduces the risk of defective programs due to incorrect references.

Since the generation rules already contain a reference to the region comprising the block in question, improved security against defective programs is achieved. It is particularly advantageous if a generation rule may only contain references to a region comprising the assigned block. This further increases the reliability of the generated programs.

Figure 6:
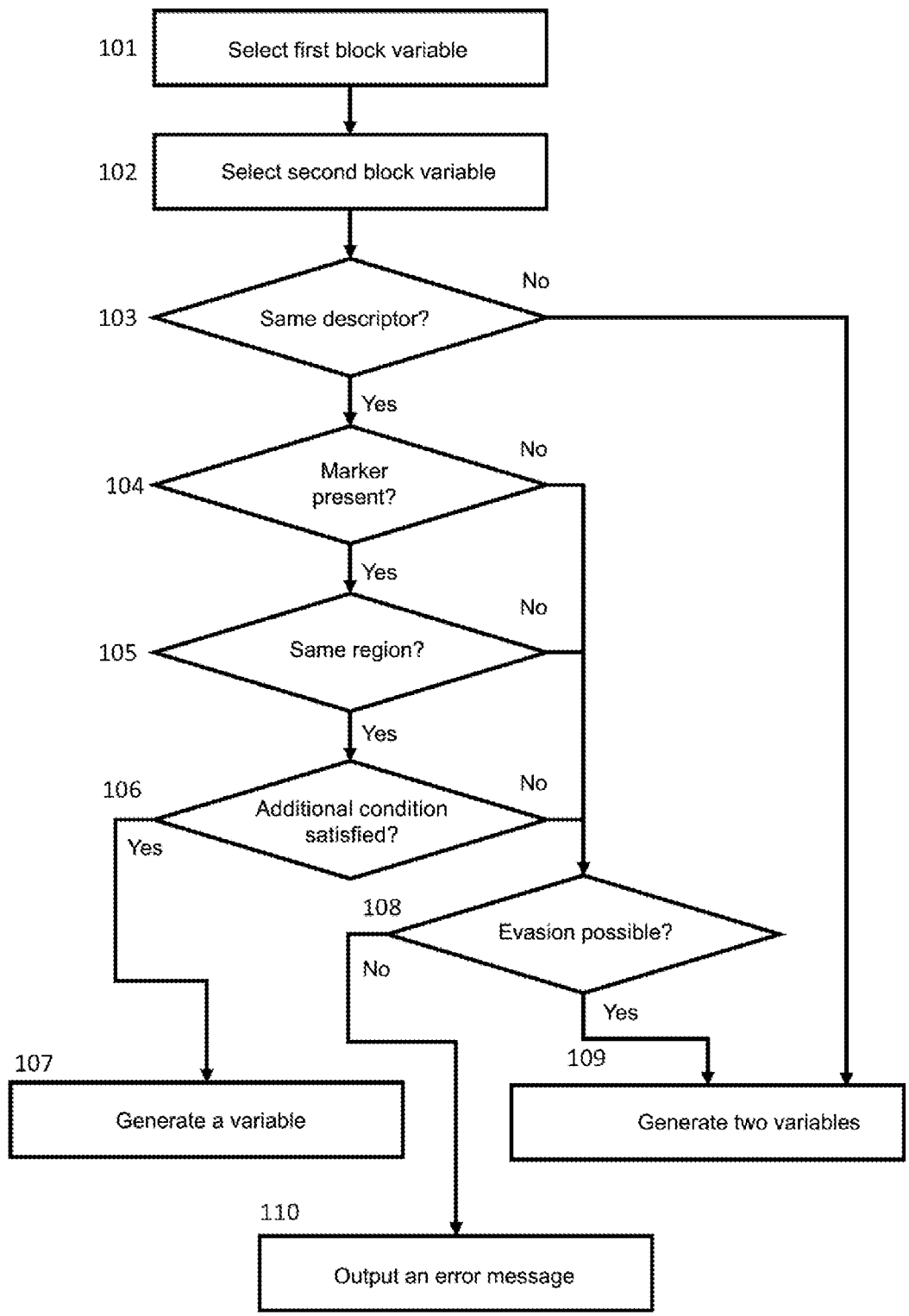
FIG. 6 depicts an exemplary schematic flowchart of an embodiment of a method in accordance with the invention.

FIG. 6 shows a schematic flowchart of an exemplary embodiment of a method in accordance with the invention, wherein only the procedure for a first and a second block variable is shown here. In accordance with an advantageous embodiment of the invention, a list of the block variables present in the block diagram is first created, wherein all block variables are examined consecutively. All possible pairs of block variables may be examined.

Two block variables are selected to check a possible grouping; that is, a first block variable in step 101 and a second block variable in step 102.

Step 103 examines whether or not the first and second block variables have the same descriptor. This may include the evaluation of generation rules. If the block variables have different descriptors, a transition to step 109 takes place.

If the block variables have the same names, step 104 examines whether one eligibility marker is set in both variables. If the marker is set in only one of the block variables, it may be advantageous to create a separate variable in the source code for the block variable without an eligibility marker, and to select a new block variable for the comparison instead. If there is no eligibility marker for one or both block variables, a transition to step 108 takes place.

Subsequently, step 105 examines whether or not the block variables are arranged in the same region, and thus whether or not there is a sufficient local reference. If this is not the case, a transition to step 108 takes place.

Step 106 examines whether or not the block variables fulfill an additional condition. For example, it may be necessary for the first and second block variables in the definition data collection to have one or more concordant properties, such as scaling in particular. If the additional condition is not fulfilled, a transition to step 108 takes place.

If all previously examined conditions are fulfilled, the first and second block variables are grouped in step 107 to form a variable in the source code; thus, one variable is generated.

If the two block variables have the same descriptor, but at least one of the other conditions is not fulfilled, step 108 examines whether an evasion is possible; that is, a differently named variable may be generated for one of the block variables in the program code. It is advantageous if a possible renaming or an alternative rule is also defined in a generation rule. If, in the specific case, no evasion is possible, an error message is issued to the user in step 110. In addition, it may optionally be provided to abort code generation so that necessary adjustments to the model may be made first.

If an evasion is possible or if at least one of the examined conditions 104, 105 and 106 was not fulfilled, two separate variables are generated in step 109.

After (in step 108) one or (in step 109) two variables have been generated in the source code, the method may be performed with the other block variables to be examined.

In principle, the order of the examined conditions may be changed, and it may also be provided that multiple conditions are examined in one step, for example, if the descriptors of the block variables also contain information regarding the region. In other embodiments of the invention, it may also be provided that a list of all block variables in a given region is first created, wherein the additional conditions are then examined only for the variables contained in the list. Furthermore, it may be provided that the optimization takes place in multiple steps; thus, that a large number of variables are first created in the source code and then grouped on the basis of a comparison of the assigned block variables.

In alternative embodiments of the invention, it may also be provided that different eligibility or check markers are linked with different additional conditions. For example, a grouping of variables can be permitted if they comprise block parameters that are only read, which thus can represent a calibration size in particular. In another example, a grouping may be allowed if the different block variables have disjunct lifetimes, such that side effects due to overlapping read/write operations of different blocks can be ruled out.

Figure 7:
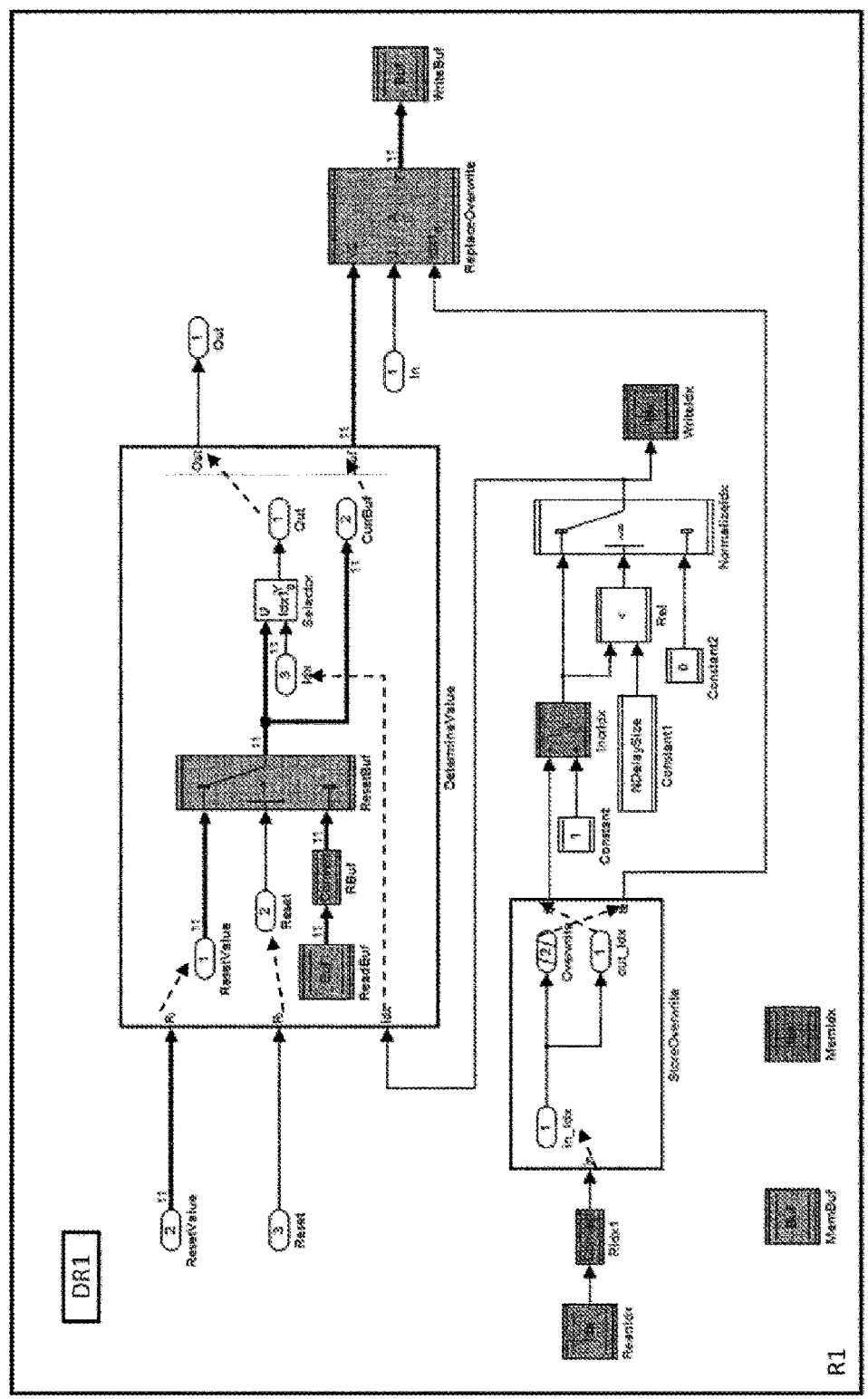
FIG. 7 depicts an exemplary embodiment of a block diagram.

FIG. 7 shows a detailed exemplary embodiment of a block diagram that provides the functionality of a buffer with a reset option. This serves in particular to implement a block with the corresponding functionality in an superordinate model that is not shown, wherein the block diagram may be referenced once or multiple times; thus, it may represent a complex library block.

In this example, the two blocks DetermineValue and StoreOverwrite are atomic subsystems, which are implemented in a subordinate hierarchy level but executed in one calculation step. For the sake of better clarity, the respective implementation in the block itself is shown here, wherein dashed arrows indicate the connection between the signal connected to the respective block and the assigned input or output port of the subordinate hierarchy level. Ports are shown with rounded corners, wherein the signal direction indicates whether or not it comprises an input port receiving a signal or an output port. A definition block DR1 is arranged in the block diagram according to the example; this defines a region R1 that includes all the blocks shown.

The block diagram shown has the input port In which receives a scalar signal, the input port ResetValue which receives a vector signal with a width of 11, and the input port Reset which receives a scalar or Boolean signal. It also has an output port Out which sends a scalar signal. Two unconnected blocks MemBuf and MemIdx define memory blocks (DataStoreMemory) which may be accessed via special write or read blocks. The memory blocks can retain their value between multiple calls of the functionality implemented in the block diagram and thus represent states. The memory block MemBuf is read with the block ReadBuf and written with the block WriteBuf. Accordingly, the memory block MemIdx is read with the block ReadIdx and written with the block WriteIdx.

An externally created vector signal ResetValue is fed to the switching input of the block ResetBuf in the atomic subsystem Determine Value; such subsystem furthermore receives the externally applied signal Reset and the current value of the memory block MemBuf. This is read out via the block ReadBuf and suitably converted via the block RBuf (Convert). The block ResetBuf supplies either the current value of the memory block or the value of the ResetValue signal as an output signal, depending on the present switching value. Via the selector block Selector, the scalar value with the index Idx may be extracted from the bus signal and output via the output port Out. The entire vector signal is also transferred to the output port CurBuf.

The value currently stored in the memory block MemIdx is read out via the block ReadIdx, converted suitably by the block RIdx1 (Convert) and then fed via the input port in_Idx to the atomic subsystem StoreOverwrite. This has two output ports Overwrite and out_Idx, each of which outputs the same value.

The output port out_Idx is connected to a first input of the sum block IncrIdx, whose second input is supplied with the fixed value 1 via a constant block Constant. The output signal of IncrIdx is fed to an input of the block Normalize_Idx and a first input of the comparison block Rel. The value NDelaySize is applied to the second input of the comparison block Rel via constant block Constant1, such that the comparison block Rel outputs the value 1 or 0, depending on whether or not the output signal of IncrIdx is smaller than NDelaySize. The output of comparison block Rel is connected to a switching input of block NormalizeIdx. Via a constant block Constant2, the block NormalizeIdx continues to be supplied with the constant value 0. Thus, the output signal of IncrIdx is present at the output of NormalizeIdx as long as it is smaller than NDelaysize; otherwise, the output value of NormalizeIdx becomes 0. The output of the block NormalizeIdx is connected to the block WriteIdx for writing to the memory block MemIdx and to the input port Idx of the atomic subsystem DetermineValue.

The output port Overwrite is connected to an index input of the assignment block ReplaceOverwrite. A value input of ReplaceOverwrite receives a scalar value created externally via an input port In. Furthermore, a vector input of the assignment block ReplaceOverwrite is connected to the output port CurrBuf of the atomic subsystem DetermineValue. The output of the allocation block to which a vector signal is applied is connected to the block WriteBuf for writing to the memory block MemBuf. Thus, the allocation block ReplaceOverwrite can change the current value of the scalar partial signal arranged at the position given by Overwrite in the bus.

From the block diagram shown in FIG. 7, the source code of Listing 1 can be generated (here, in the C language).

Listing 1:

```
#define NDelaysize 10
Int16 In, Overwrite, Idx, Out, idx1;
Int16 Buf[NDelaySize+1];
Int16 ResetValue[NDelaySize+1];
Overwrite = Idx;
Idx = Idx + 1;
if (Idx >= NDelaySize) {
    Idx = 0;
}
if (Reset) {
    for (idx1 = 0; idx1 < NDelaySize; idx1++) {
        Buf[idx1] = ResetValue[idx1];
    }
}
Out = Buf[Idx];
Buf[Overwrite] = In;
```

The procedure in principle for generating the source code was described above in connection with FIG. 3. In the present case, on the one hand, the block variables of the blocks MemBuf, ReadBuf, WriteBuf, RBuf and ResetBuf were grouped into an array variable Buf[ ]. On the other hand, the block variables of the blocks MemIdx, ReadIdx, WriteIdx, RIdx1 and IncrIdx were grouped into a scalar variable Idx.

If the functionality defined in the block diagram of FIG. 7 is to be used multiple times, it is useful to store the data in a structure that is referenced by a pointer. This enables the instructions to be used as frequently as desired (Function Reuse), wherein only the data must be instance-specific; that is, it must exist multiple times in the memory. The corresponding source code is given in Listing 2.

Listing 2:

```
#define NDelaysize 10
Struct tagISV {
Int16 IdxBWR;
Int16 BufBWR[NDelaysize+1];
};
void BufWithReset(Int16 In, Int16 ResetValue[NDelaysize +1],
Bool Reset,  Int16* Out, struct tagISV* pISV)
{
Int32 idx1;
Int16 Overwrite;
Overwrite = pISV->IdxBWR;
pISV->IdxBWR = pISV->IdxBWR + 1;
if (pISV->IdxBWR >= NDelaysize) {
    pISV->IdxBWR = 0;
}
if (Reset) {
    for (idx1= 0; idx1 < NDelaysize; idx1++) {
        pISV->BufBWR[idx1] = ResetValue[idx1];
    }
}
*Out = pISV->BufBWR[pISV->IdxBWR];
pISV->BufBWR[Overwrite] = In;
}
```

Here as well, the block variables of the blocks MemBuf, ReadBuf, WriteBuf, RBuf and ResetBuf were grouped into an array variable BufBWR[ ], and the block variables of the blocks MemIdx, ReadIdx, WriteIdx, RIdx1 and IncrIdx were grouped into a scalar variable IdxBWR. The instance-specific variables are defined in a structure that may be addressed by a pointer in order to allow a convenient reuse of the function.

In the event that library blocks are used multiple times, a method in accordance with the invention enables a particularly extensive optimization.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating source code from one or more blocks of a block diagram, comprising:

generating, by a computer system, the block diagram, wherein the block diagram comprises a model of a dynamic system having at least one signal connection between two blocks, wherein the block diagram is executable to simulate the dynamic system, wherein at least one region in which one or more blocks is located is defined in the block diagram, wherein the block diagram comprises a first block and a second block, wherein the first block has a first block variable and the second block has a second block variable, and wherein each block variable of the block diagram has a descriptor;

determining, by the computer system, whether the descriptors of the first and second block variables are concordant or different and whether or not the first and second blocks are located in the same region, wherein determining whether the descriptors of the first and second block variables are concordant or different is based on comparing the descriptor of the first block variable with the descriptor of the second block variable; and implementing, by the computer system, the first and second block variables as a single variable or as two separate variables in the source code based on the determination of whether the descriptors of the first and second block variables are concordant or different and whether or not the first and second blocks are located in the same region, wherein the first and second block variables are implemented in the source code as a single variable if the descriptors of the first and second block variables are concordant and the first and second blocks are located in the same region, and wherein the first and second block variables are implemented in the source code as two separate variables if the descriptors of the first and second block variables are different and/or the first and second blocks are not located in the same region.

2. The method according to claim 1, wherein the block diagram is defined hierarchically, wherein a block at a higher level comprises multiple blocks of a subordinate level, wherein blocks at a subordinate level are assigned to a block at a higher level; and wherein the block diagram comprises one or more definition blocks, wherein a region is defined by a definition block in such a manner that the block of the next higher level comprising the definition block and all blocks assigned to this block are located in the region.

3. The method according to claim 2, wherein the block diagram comprises at least two definition blocks which are encompassed by a common block of a higher level, wherein a first definition block is arranged in a first level and a second definition block is arranged in a second level subordinate to the first level, wherein the first block defines a first region and wherein the second block defines a second region in such a manner that the block comprising the second definition block of the next level higher than the second level and all blocks assigned to such block are located in the second region.

4. The method according to claim 3, the at least two definition blocks comprise at least two varieties of definition blocks;

wherein a variety of marked definition blocks is defined;

wherein, in the event that the first definition block is a marked definition block, the first region and the second region are grouped into a common region, and wherein, otherwise, the first region and the second region are treated as separate regions.

5. The method according to claim 2, wherein the descriptor of a block variable is determined from an evaluation of at least one generation rule, wherein the generation rule determines the descriptor of the block variable on the basis of the block of a higher level in which the block having the block variable is contained and/or on the basis of the region in which the block having the block variable is located.

6. The method according to claim 5, wherein determining whether or not the first and second two blocks are located in the same region by is based on comparing the descriptor of the first block variable with the descriptor of the second block variable.

7. The method according to claim 1, wherein predefined blocks that provide a functionality are insertable from a library into the block diagram;

wherein the block diagram comprises multiple instances of a block having the same functionality;

wherein an independent region is defined for each instance, or a common function is defined for the instances and a data structure with the block variables is defined for each instance, wherein the corresponding data structure is transferred to the common function depending on the block to be executed.

8. The method according to claim 1, wherein each of the first and second block variables has an eligibility marker;

wherein implementing the first and second block variables as a single variable or as two separate variables in the source code is further based on the eligibility markers of the first and second block variables; and wherein the first and second block variables are implemented as a single variable only if the eligibility marker is set in both block variables.

9. The method according to claim 8, wherein each block variable has at least one check marker;

wherein the first and second block variables are implemented as a single variable only if the check marker is set in both block variables and at least one check condition assigned to each check marker is also fulfilled, wherein the at least one check condition comprises one or more of the following check conditions:

whether or not the block variables within the block are not changed but are only read out;

whether or not the lifetimes of different instances of the block variables are disjunct, such that the two block variables are read or written only at different, non-overlapping times;

whether or not the same variable definition is assigned to the block variables in a definition data collection; or whether or not the block variables are arranged at an equally specified directional connection.

10. The method according to claim 8, wherein implementing the first and second block variables as a single variable or as two separate variables in the source code is further based on one or more of the following conditions being fulfilled:

the block variables being assigned the same data type;

the block variables being assigned compatible units of measurement; or the names of block variables being determined via the same generation rule.

11. The method according to claim 1, wherein at least one block variable is automatically generated based on directional connections between blocks;
- wherein the first block is connected to the second block and the second block is connected to a third block;
- wherein the first block variable of the first block is generated for the connection originating from the first block, and one the second block variable of the second block is generated for the connection originating from the second block;
- wherein the first block and the second block are located in the same region; and
- wherein the first and second block variables are implemented as a single variable in the source code.

12. The method according to claim 1, wherein the block diagram comprises one or more definition blocks that define a region, wherein blocks that are not located in a region spanned by a definition block are assigned to an additional region, such that each block of the block diagram is located in a region and/or such that a separation region is defined, wherein the block variables of blocks located in the separation region are always implemented as separate variables in the source code.

13. The method according to claim 1, wherein the generated source code is compiled to generate an executable code and the executable code is transferred to a control device for configuring the control device.

14. A non-transitory computer-readable storage medium on which processor-executable instructions are stored for generating source code from one or more blocks of a block diagram, wherein the processor-executable instructions, when executed by a processor, facilitate:
- generating the block diagram, wherein the block diagram comprises a model of a dynamic system having at least one signal connection between two blocks, wherein the block diagram is executable to simulate the dynamic system, wherein at least one region in which one or more blocks is located is defined in the block diagram, wherein the block diagram comprises a first block and a second block, wherein the first block has a first block variable and the second block has a second block variable, and wherein each block variable of the block diagram has a descriptor;
- determining whether the descriptors of the first and second block variables are concordant or different and whether or not the first and second blocks are located in the same region, wherein determining whether the descriptors of the first and second block variables are concordant or different is based on comparing the descriptor of the first block variable with the descriptor of the second block variable;
- implementing the first and second block variables as a single variable in the source code if the descriptors of the first and second block variables are concordant and the first and second blocks are located in the same region; and
- implementing the first and second block variables as two separate variables in the source code if the descriptors of the first and second block variables are different and/or the first and second blocks are not located in the same region.

15. A computer system for generating source code from one or more blocks of a block diagram, comprising:
- a human-machine interface;
- a non-volatile memory; and
- a processor;
- wherein the processor is configured to execute processor-executable instructions stored on the non-volatile memory to facilitate:
- generating the block diagram, wherein the block diagram comprises a model of a dynamic system having at least one signal connection between two blocks, wherein the block diagram is executable to simulate the dynamic system, wherein at least one region in which one or more blocks is located is defined in the block diagram, wherein the block diagram comprises a first block and a second block, wherein the first block has a first block variable and the second block has a second block variable, and wherein each block variable of the block diagram has a descriptor;
- determining whether the descriptors of the first and second block variables are concordant or different and whether or not the first and second blocks are located in the same region, wherein determining whether the descriptors of the first and second block variables are concordant or different is based on comparing the descriptor of the first block variable with the descriptor of the second block variable;
- implementing the first and second block variables as a single variable in the source code if the descriptors of the first and second block variables are concordant and the first and second blocks are located in the same region; and
- implementing the first and second block variables as two separate variables in the source code if the descriptors of the first and second block variables are different and/or the first and second blocks are not located in the same region.

* * * * *